US008477390B2

(12) United States Patent　　(10) Patent No.: US 8,477,390 B2
Iwayama　　(45) Date of Patent: Jul. 2, 2013

(54) IMAGE PROCESSOR, IMAGE PROCESSING METHOD, AND COMPUTER PROGRAM PRODUCT

(75) Inventor: Akira Iwayama, Ishikawa (JP)

(73) Assignee: PFU Limited (JP)

( * ) Notice: Subject to any disclaimer, the term of this patent is extended or adjusted under 35 U.S.C. 154(b) by 862 days.

(21) Appl. No.: 12/232,921

(22) Filed: Sep. 26, 2008

(65) Prior Publication Data

US 2009/0231639 A1　Sep. 17, 2009

(30) Foreign Application Priority Data

Mar. 11, 2008　(JP) ................................ 2008-061716

(51) Int. Cl.
*G06K 15/00*　(2006.01)
*G06K 9/48*　(2006.01)
*G06K 9/36*　(2006.01)
*G06K 9/32*　(2006.01)
*H04N 1/387*　(2006.01)

(52) U.S. Cl.
USPC .......... 358/488; 358/1.12; 358/452; 358/453; 358/474; 382/199; 382/276; 382/284; 382/289; 382/290; 382/296; 382/297; 382/298; 382/299

(58) Field of Classification Search
None
See application file for complete search history.

(56) References Cited

U.S. PATENT DOCUMENTS

| | | | |
|---|---|---|---|
| 6,271,935 B1 * | 8/2001 | Cook | 358/1.9 |
| 6,298,157 B1 * | 10/2001 | Wilensky | 382/199 |
| 6,373,590 B1 * | 4/2002 | Ancin et al. | 358/1.18 |
| 6,418,244 B2 * | 7/2002 | Zhou et al. | 382/306 |

FOREIGN PATENT DOCUMENTS

| | | |
|---|---|---|
| JE | 3910224 B2 | 2/2007 |
| JP | 58-033778 A | 2/1983 |
| JP | H11-177774 A | 7/1999 |
| JP | H11-296668 A | 10/1999 |
| JP | H11-331547 A | 11/1999 |
| JP | 2001-036696 A | 2/2001 |
| JP | 2004-363889 A | 12/2004 |
| JP | 2005-039620 | 2/2005 |
| JP | 2007-088654 A | 4/2007 |
| JP | 2007-189577 A | 7/2007 |
| JP | 4148279 | 7/2008 |
| JP | 2002-010059 A | 1/2011 |

OTHER PUBLICATIONS

Takami Yoshitaka; "Image Reader"; JP Pub date Feb. 2005; Machine translation in english of JP Pub 2005-039620.*
Japanese Office Action dated Nov. 8, 2011 in corresponding Japanese patent application No. 2008-061716.
Office Action from Chinese Application No. 200810171090.5; Nov. 26, 2010.

* cited by examiner

*Primary Examiner* — Benny Q Tieu
*Assistant Examiner* — Haris Sabah
(74) *Attorney, Agent, or Firm* — Lowe Hauptman Ham & Berner, LLP

(57) ABSTRACT

An image processor includes a control unit, wherein the control unit includes an image obtaining unit that obtains an image including a document area corresponding to a document read by an image reader, an edge coordinate detecting unit that detects coordinate values of edge candidate pixels, a tilt calculating unit that calculates a tilt of the document area, or a tilt obtaining unit that obtains the tilt of the document area detected by a predetermined sensor, an edge end coordinate extracting unit that extracts a coordinate value of an edge end candidate pixel, a straight line calculating unit that calculates a straight line corresponding to the edge, and either one or both of a tilt correcting unit that corrects the tilt of the document area by rotating the document area, and an area clipping unit that clips the document area from the image.

9 Claims, 10 Drawing Sheets
(7 of 10 Drawing Sheet(s) Filed in Color)

FIG.11
(CONVENTIONAL ART)
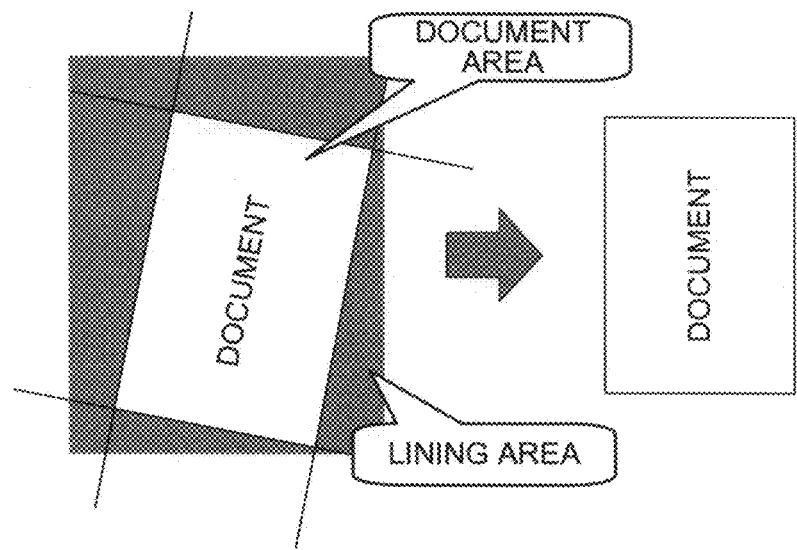
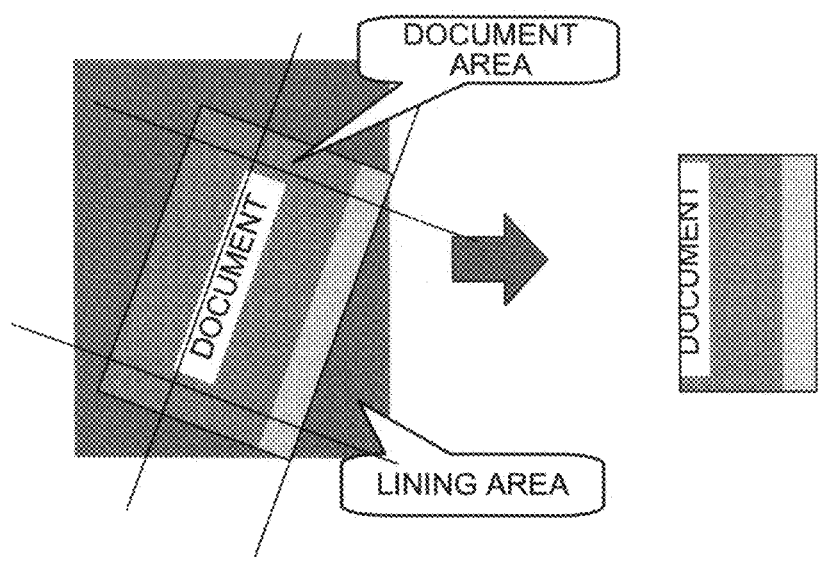

FIG.12
(CONVENTIONAL ART)
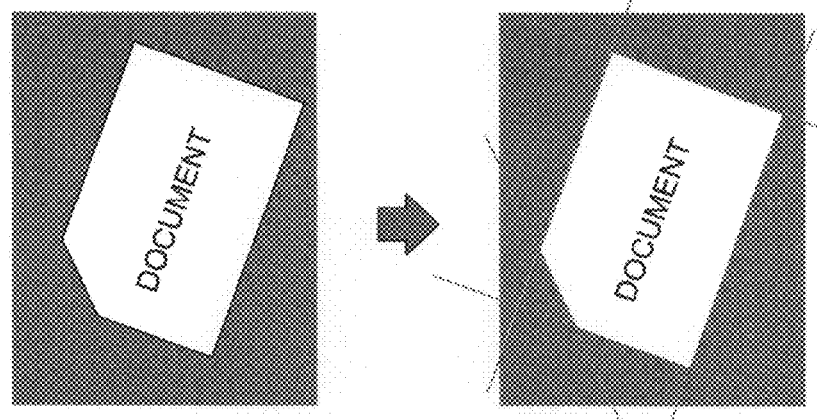
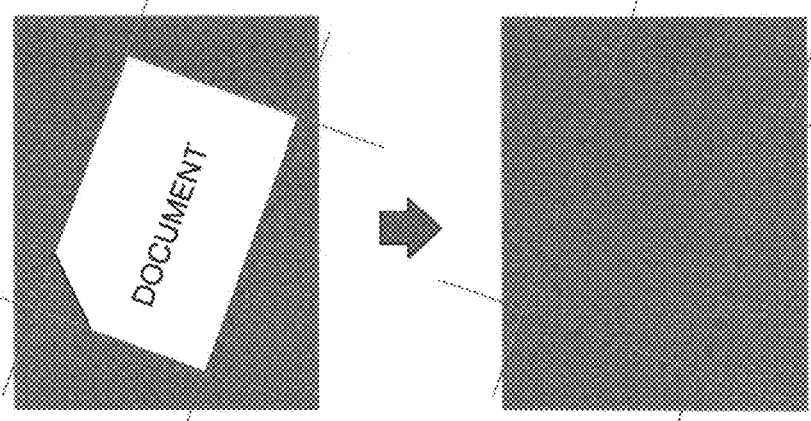
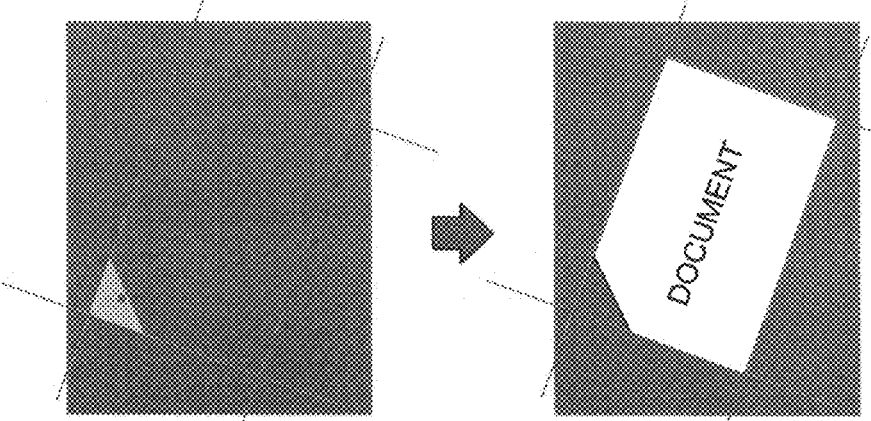

IMAGE PROCESSOR, IMAGE PROCESSING METHOD, AND COMPUTER PROGRAM PRODUCT

RELATED APPLICATIONS

The present application is based on, and claims priority from, Japan Application Number 2008-061716, filed Mar. 11, 2008, the disclosure of which is hereby incorporated by reference herein in its entirety.

BACKGROUND OF THE INVENTION

1. Field of the Invention

The present invention relates to an image processor, an image processing method, and a computer program product.

2. Description of the Related Art

Conventionally, for automatically recognizing a document area in an image, a lining portion (lining area) of an image reader such as a scanner can be switched to white or black. When reading the image, the lining portion is changed to black such that there is a difference between concentrations of a document area and the lining portion. Thereby, when the difference between concentrations of the document area and the lining portion is large (specifically, when the difference between concentrations of edges of the document area and the lining portion is large), as shown in an upper part of FIG. 11, which is a view showing one example of the conventional art, a rectangular document area may be correctly recognized by four straight lines, that is to say, the edges of the document area may be correctly recognized, and consequently it is possible to perform tilt correction (deskew, skew correction)) of the document area and clipping (cropping) of the document correctly (for example, refer to JP-A-2007-88654). However, when the document is read in a bending state, the document area without a bent portion is recognized, as shown in FIG. 12, which is a view showing one example of the conventional art.

However, when the difference between concentrations of the document area and the lining portion is small, the document area might be recognized by four straight lines as shown in a lower part of FIG. 11, so that it becomes difficult to correctly recognize the edges of the document area, and consequently it also becomes difficult to perform the deskewing and the cropping correctly.

Therefore, JP-A-2004-363889 discloses a technique of utilizing both images of front and back sides when identifying the background area. JP-A-2007-189577 discloses the technique of performing a tilt correction of the document area based on a detection result of the edge to determine the document area based on a histogram of luminance of longitudinal and horizontal pixels of the document area after being corrected. Japanese Patent No. 3910224 discloses the technique of detecting a skew amount by detecting two corners of a forward edge of the document area. JP-A-58-33778 discloses the technique of performing a skew correction by detecting the outermost position of the document area.

However, according to the conventional art, when the difference between concentrations of the document area and the lining portion is small for both images of front and back sides, it is still difficult to recognize the edge of the document area correctly, and consequently there is a problem that it is also still difficult to correctly perform the deskewing and the cropping. When utilizing the both images of front and back sides, there is a problem that a process time becomes longer and a memory usage increases.

SUMMARY OF THE INVENTION

It is an object of the present invention to at least partially solve the problems in the conventional technology.

An image processor according to one aspect of the present invention includes a control unit, wherein the control unit includes an image obtaining unit that obtains an image including a document area corresponding to a document read by an image reader, an edge coordinate detecting unit that detects coordinate values of edge candidate pixels, which are candidates of pixels composing an edge of the document area based on the image obtained by the image obtaining unit, a tilt calculating unit that calculates a tilt of the document area based on the coordinate values of the edge candidate pixels detected by the edge coordinate detecting unit, or a tilt obtaining unit that obtains the tilt of the document area detected by a predetermined sensor, an edge end coordinate extracting unit that extracts a coordinate value of an edge end candidate pixel, which is a candidate of the pixel corresponding to an end of the edge, based on the coordinate values of the edge candidate pixels detected by the edge coordinate detecting unit, a straight line calculating unit that calculates a straight line corresponding to the edge based on the tilt of the document area calculated by the tilt calculating unit or obtained by the tilt obtaining unit and the coordinate value of the edge end candidate pixel extracted by the edge end coordinate extracting unit, and either one or both of a tilt correcting unit that corrects the tilt of the document area by rotating the document area based on the straight line corresponding to the edge calculated by the straight line calculating unit, and an area clipping unit that clips the document area from the image based on the straight line corresponding to the edge calculated by the straight line calculating unit.

An image processing method according to another aspect of the present invention is executed by an image processor comprising a control unit, wherein the method includes an image obtaining step of obtaining an image including a document area corresponding to a document read by an image reader, an edge coordinate detecting step of detecting coordinate values of edge candidate pixels, which are candidates of pixels composing an edge of the document area based on the image obtained by the image obtaining step, a tilt calculating step of calculating a tilt of the document area based on the coordinate values of the edge candidate pixels detected by the edge coordinate detecting step, or a tilt obtaining step that obtains the tilt of the document area detected by a predetermined sensor, an edge end coordinate extracting step of extracting a coordinate value of an edge end candidate pixel, which is a candidate of the pixel corresponding to an end of the edge, based on the coordinate values of the edge candidate pixels detected by the edge coordinate detecting step, a straight line calculating step of calculating a straight line corresponding to the edge based on the tilt of the document area calculated by the tilt calculating step or obtained by the tilt obtaining step and the coordinate value of the edge end candidate pixel extracted by the edge end coordinate extracting step, and either one or both of a tilt correcting step of correcting the tilt of the document area by rotating the document area based on the straight line corresponding to the edge calculated by the straight line calculating step, and an area clipping step of clipping the document area from the image based on the straight line corresponding to the edge calculated by the straight line calculating step.

A computer program product according to still another aspect of the present invention includes a computer readable medium including programmed instructions for executing an image processing method by an image processor comprising a control unit, wherein the instructions, when executed by a computer, cause the computer to perform an image obtaining step of obtaining an image including a document area corresponding to a document read by an image reader, an edge coordinate detecting step of detecting coordinate values of edge candidate pixels, which are candidates of pixels composing an edge of the document area based on the image obtained by the image obtaining step, a tilt calculating step of calculating a tilt of the document area based on the coordinate values of the edge candidate pixels detected by the edge coordinate detecting step, or a tilt obtaining step of obtaining the tilt of the document area detected by a predetermined sensor, an edge end coordinate extracting step of extracting a coordinate value of an edge end candidate pixel, which is a candidate of the pixel corresponding to an end of the edge, based on the coordinate values of the edge candidate pixels detected by the edge coordinate detecting step, a straight line calculating step of calculating a straight line corresponding to the edge based on the tilt of the document area calculated by the tilt calculating step or obtained by the tilt obtaining step and the coordinate value of the edge end candidate pixel extracted by the edge end coordinate extracting step, and either one or both of a tilt correcting step of correcting the tilt of the document area by rotating the document area based on the straight line corresponding to the edge calculated by the straight line calculating step, and an area clipping step of clipping the document area from the image based on the straight line corresponding to the edge calculated by the straight line calculating step.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 11 is a view showing one example of a conventional art; and

FIG. 12 is a view showing one example of a conventional art.

DETAILED DESCRIPTION OF THE PREFERRED EMBODIMENTS

The following describes an embodiment according to the present invention in detail with reference to the drawings. The embodiment is illustrative only, and is not intended to limit the present invention in any way.

1. Brief Overview of the Present Invention

Figure 1:
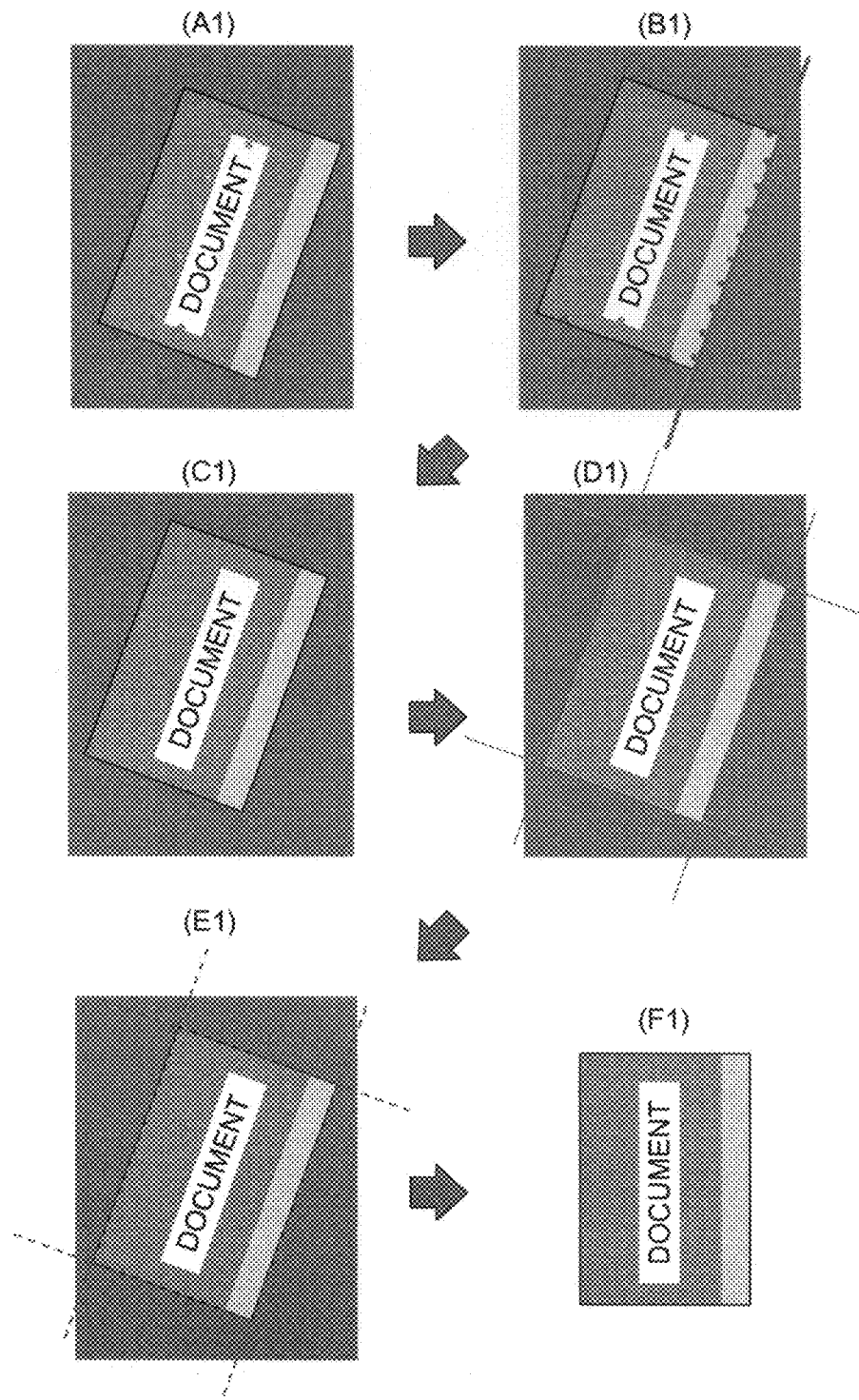
FIG. 1 is a view showing a brief overview of the present invention.
Figure 2:
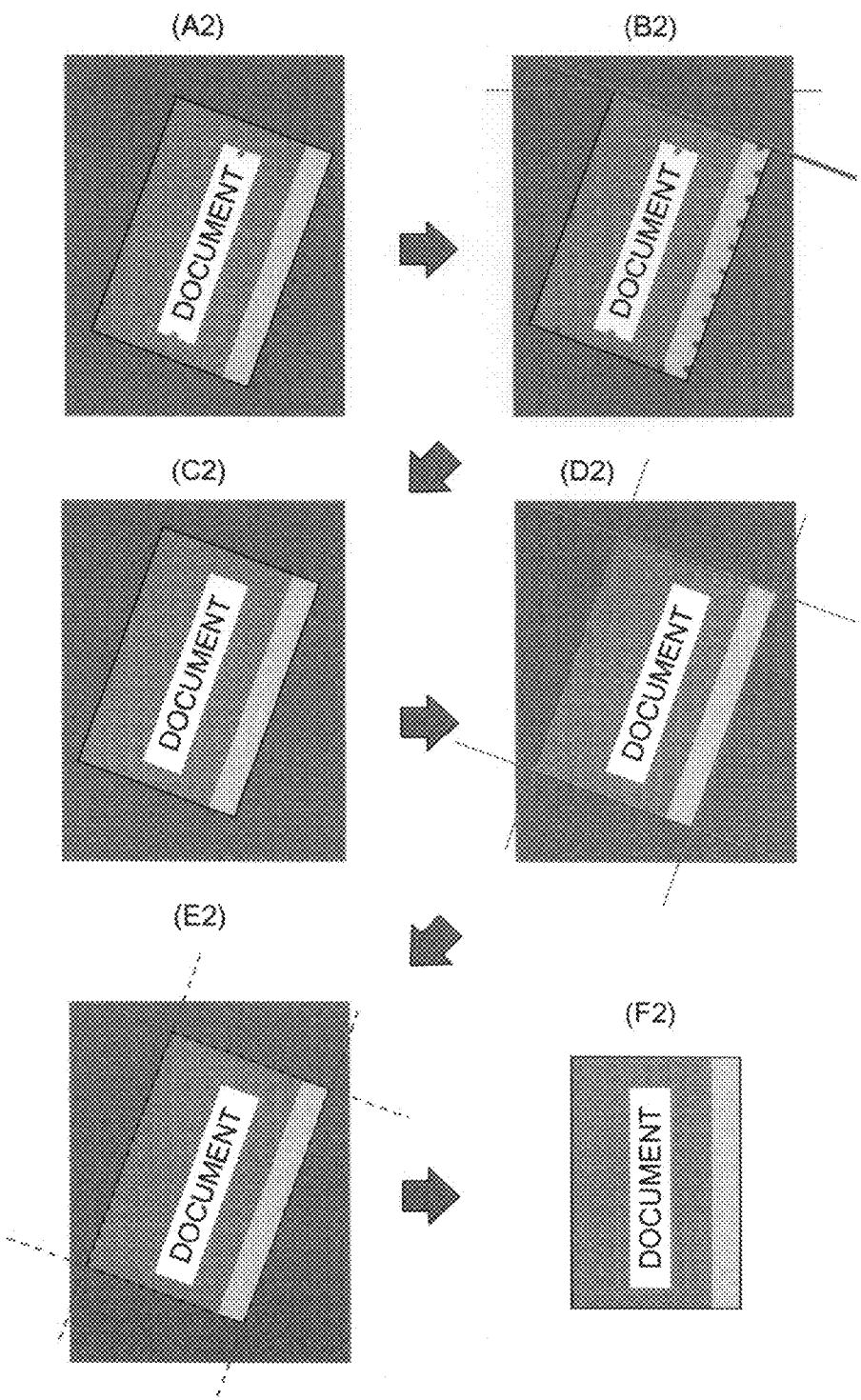
FIG. 2 is a view showing a brief overview of the present invention.

Herein, a brief overview of the present invention is explained with reference to FIGS. 1 to 6. The present invention recognizes sides (edges) of a document area corresponding to a read rectangular document by executing following procedures A1 to F1 as shown in FIG. 1 or by executing following procedures A2 to F2 as shown in FIG. 2 to perform deskewing and cropping. FIGS. 1 and 2 are views for showing the brief overview of the present invention.

A1, A2

The present invention detects pixels composing an upper side (upper edge) of the document area relative to a scan direction and detects coordinate values of the detected pixels, by comparing, for example, a difference between tone levels of each pixel of an image including the document area and a lining area with a predetermined threshold value, on the assumption that there is no tone change in the lining area. The pixels and the coordinate values thereof are detected also for a lower side (lower edge), a left side (left edge), and a right side (right edge) of the document area.

B1, B2

A tilt (tilt angle) of the document area is calculated from the coordinate values of the pixels composing each detected edge. For example, a straight line corresponding to the edge (the right edge in FIG. 1, and the upper edge in FIG. 2) is calculated by a Hough transformation and a least-square method, and the tilt angle of the document area is calculated based on the calculated straight line.

C1, C2

One or more pixel considered to be an end of the upper edge (pixel considered to be a corner (angle, apex) of the document area) is extracted based on the coordinate values of the pixels composing the detected upper edge. The pixel considered to be the end of the edge is extracted also for the lower edge, the left edge, and the right edge. When the edge is not detected incorrectly in the procedures A1 and A2, the outermost pixel is extracted as the pixel considered to be the end of the edge.

D1, D2

A straight line passing through the extracted pixel considered to be the end of the upper edge, and being parallel to the calculated tilt angle is calculated. A straight line passing through the extracted pixel considered to be the end of the left edge, and being perpendicular to the calculated tilt angle is calculated. A straight line is calculated also for the lower edge just as the upper edge. The straight line is calculated also for the right edge just as the left edge. Thereby, four straight lines corresponding to each edge are calculated.

E1, E2

The coordinate values of four points (pixels) at which the calculated four straight lines intersect are calculated as the coordinate values of the pixels corresponding to the corners (angles, apexes) of the document area.

F1, F2

The document area is rotated in a direction to negate the calculated tilt angle, based on the coordinate values of the calculated four pixels. An area enclosed by the four pixels corresponding to the document area is clipped from the image based on the coordinate values of the four pixels corresponding to the corners of the document area after being rotated.

As above, according to the present invention, even when a difference between concentrations of the document area and a lining portion (specifically, the difference between concentrations of the edges of the document area and the lining portion) is small, the edges of the document area may be recognized with high accuracy, without reducing a process speed and without increasing a memory usage, and, consequently, the deskewing and the cropping may be performed with high accuracy.

Figure 3:
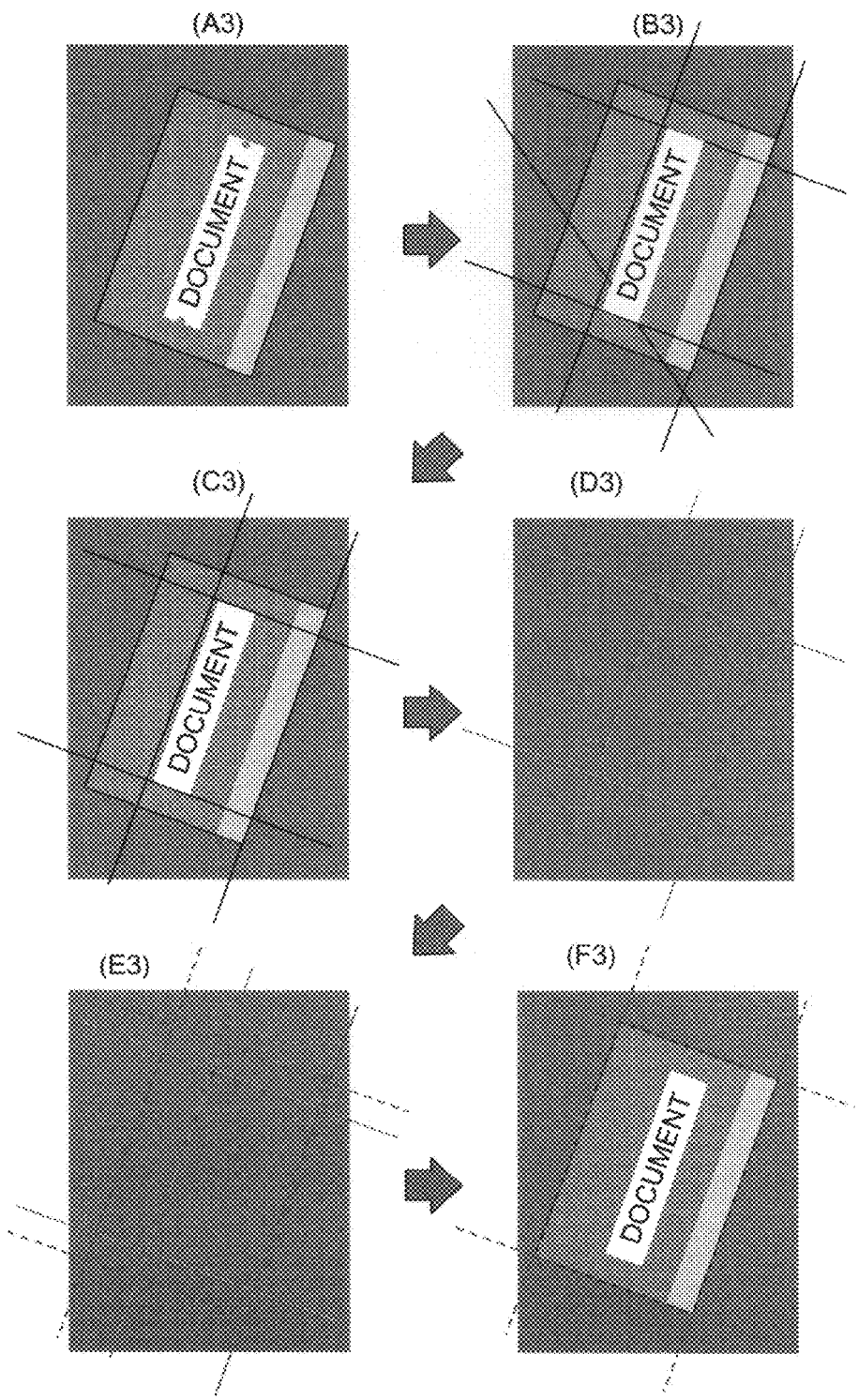
FIG. 3 is a view showing a brief overview of the present invention.

The present invention may recognize the edges of the document area by executing following procedures A3 to F3 as shown in FIG. 3. FIG. 3 is a view for showing the brief overview of the present invention.

A3

Just as the procedures A1 and A2, the pixels composing each edge of the document area are detected, and the coordinate values of the detected pixels are detected.

B3

A straight line considered to correspond to the edge is calculated for each edge, for example, by the Hough transformation and the least-square method from the coordinate values of the pixels composing each edge of the document area. In this processing stage, with respect to one edge, a plurality of straight lines considered to correspond to this edge are sometimes calculated. For example, five straight lines, which are more than the number of edges (four), are sometimes calculated, as shown in FIG. 3.

C3

Out of the calculated straight lines, one straight line considered to correspond to the edge is selected for each edge. For example, when five straight lines are calculated as shown in FIG. 3, a total of four straight lines considered to correspond to the edges are selected out of the five straight lines. A provisional shape of the document area is recognized based on the selected four straight lines.

D3

The pixel farthest from the selected straight line is selected out of the pixels composing each detected edge for each straight line. That is to say, an outermost pixel with respect to the provisional document area enclosed by the selected four straight lines is selected.

E3

The four selected straight lines are appropriately corrected so as to pass through the selected pixels. That is to say, the provisional document area is corrected.

F3

The coordinate values of the four points (pixels) at which the four straight lines after being corrected intersect are calculated as the coordinate values of the pixels corresponding to the corners (angles, apexes) of the document area.

As above, according to the present invention, the pixels corresponding to the corners of the document area may be correctly recognized, by appropriately correcting the four straight lines defining the document area, even when the pixels composing each edge is detected incorrectly.

In the procedures A1, A2 and A3, the present invention may detect the pixels composing each edge while removing noise included in the lining area. For example, the pixels composing each edge may be detected while removing the noise in the lining area, using a method disclosed in JP-A-2007-88654 filed by the applicant of the present invention.

Figure 4:
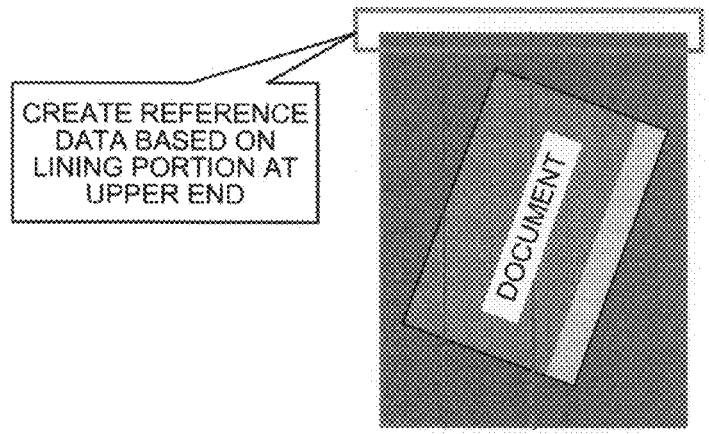
FIG. 4 is a view showing a brief overview of a noise removing method in the present invention.
Figure 5:
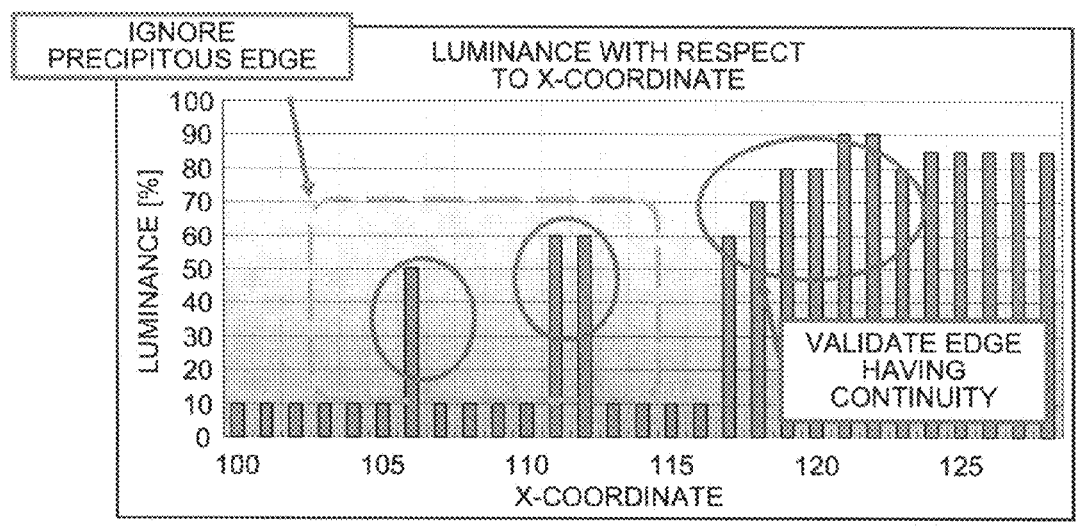
FIG. 5 is a view showing a brief overview of the noise removing method in the present invention.
Figure 6:
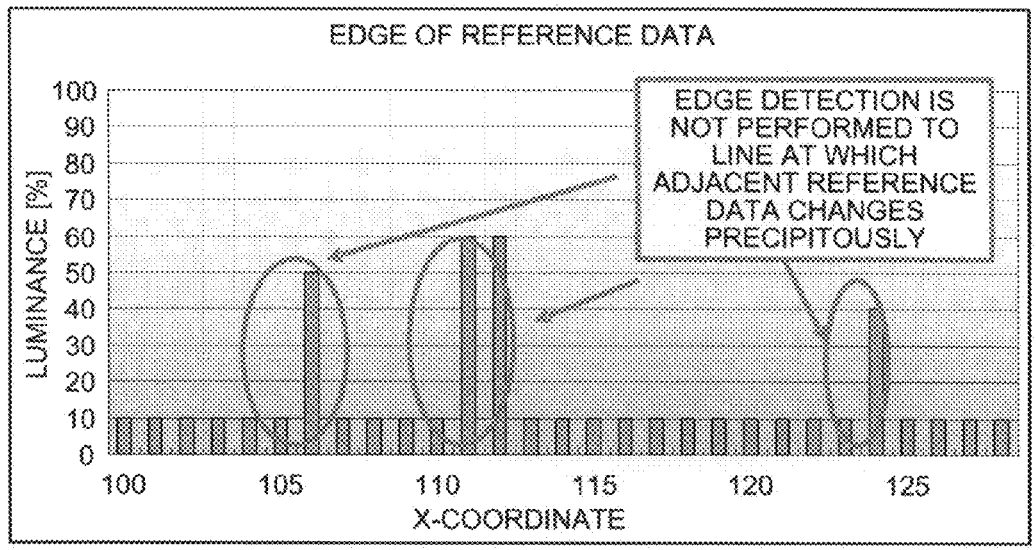
FIG. 6 is a view showing a brief overview of the noise removing method in the present invention.

Specifically, reference data for determining the noise of the image may be created using a background portion at the upper end of the image (the background portion at the lower end may also be used), as shown in FIG. 4 to detect the pixels composing each edge based on a difference value with respect to the created reference data. When detecting the edge from a lateral direction as shown in FIG. 5, the pixels composing each edge may be detected while performing a filtering process (for example, a process to ignore the edge at which luminance changes precipitously and validate the edge having continuous luminance, as shown in FIG. 5) such that a width of the end of the document is equal to or larger than a specified width. When detecting the edge in a longitudinal direction as shown in FIG. 6, the pixel composing each edge may be detected while removing the edge at which adjacent reference data changes precipitously from a detection object (specifically, while determining the edge at which the difference value of the adjacent reference data is not equal to or larger than a certain value as the noise (vertical line) and removing the same from the detection object).

Thereby, for example, in an Auto Document Feeder (ADF) type scanner in which an image reading unit is fixed, the noise (vertical line) of the image detected at the same position may be effectively removed.

2. Configuration of the Embodiment

Figure 7:
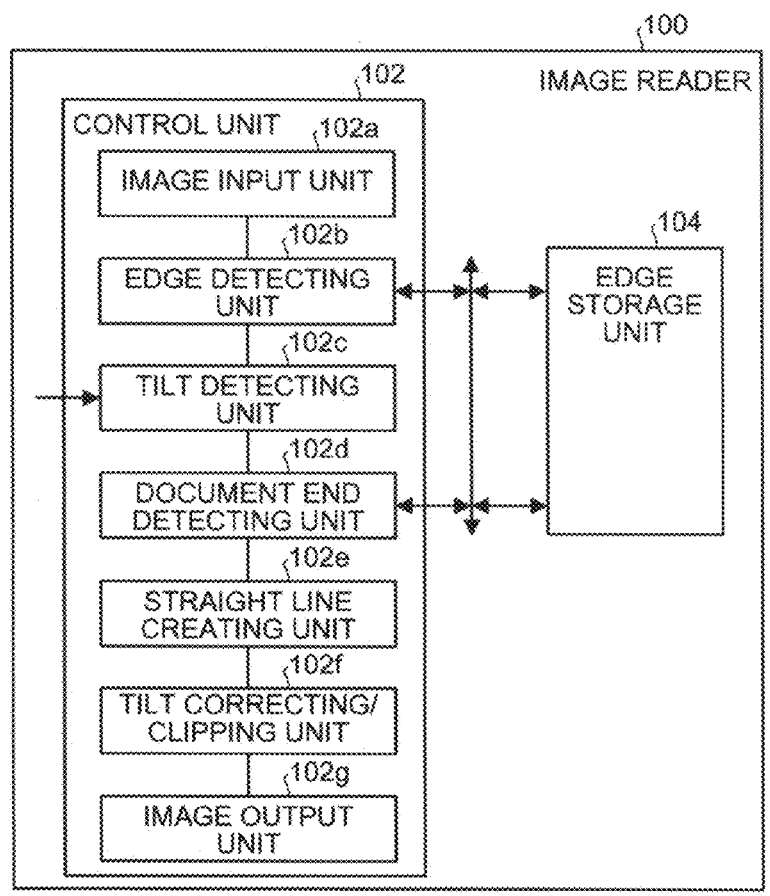
FIG. 7 is a block diagram showing one example of the first configuration of an image processor to which the present invention is applied.
Figure 8:
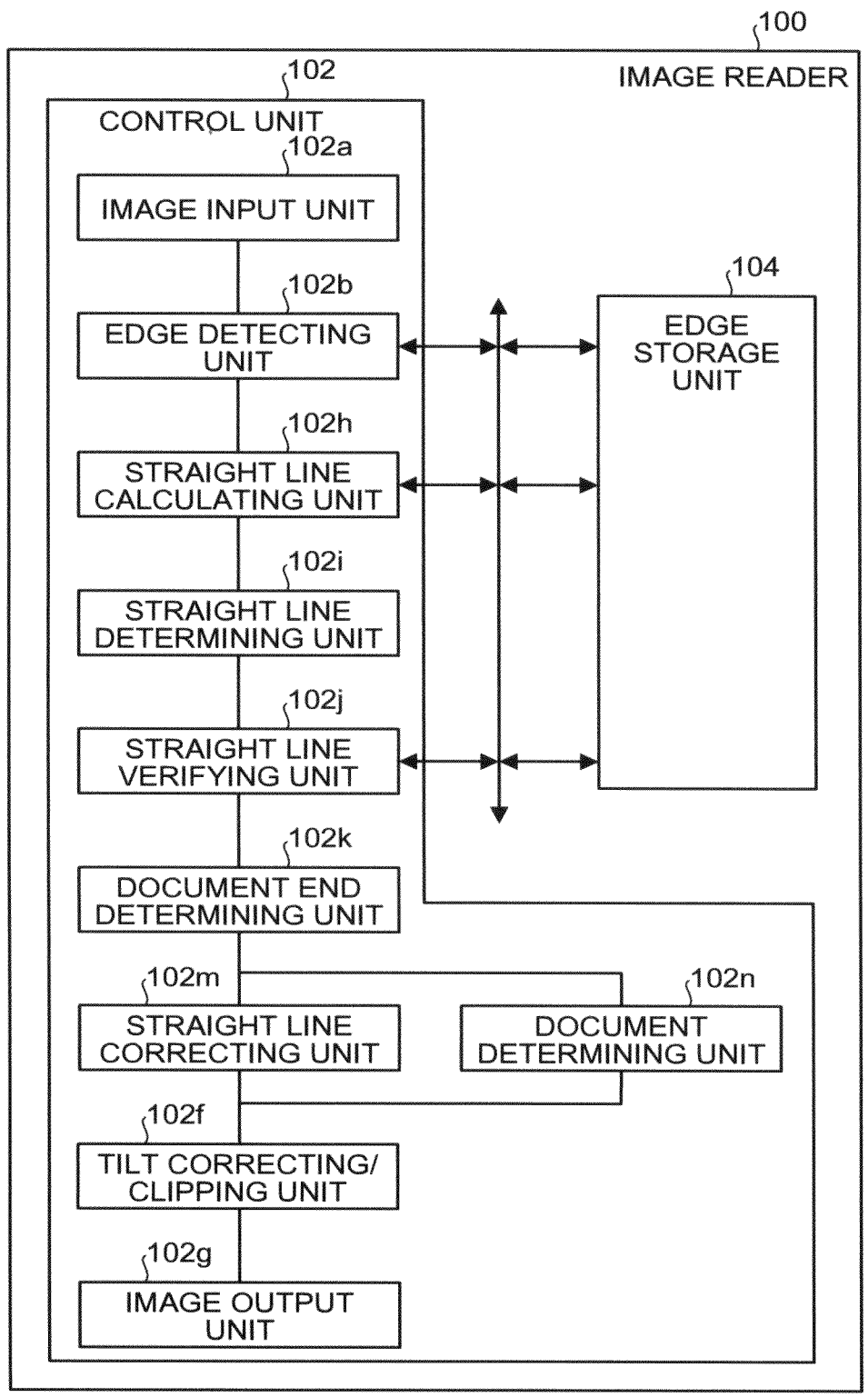
FIG. 8 is a block diagram showing one example of the second configuration of the image processor to which the present invention is applied.

Herein, the following describes configurations of an image reader 100 according to the present embodiment with reference to FIGS. 7 and 8. The following describes one example of the first configuration of the image reader 100 with reference to FIG. 7.

As shown in FIG. 7, the image reader 100 is specifically the scanner, and includes an image processor according to the present invention. The image reader 100 is largely composed of a control unit 102 and an edge storage unit 104, as shown. Each of the units is communicatably connected through an optional communication line, as shown.

The control unit 102 is formed by a Central Processing Unit (CPU) which controls the image reader 100 totally, or the like. The control unit 102 includes an internal memory for storing a control program such as an operating system (OS), a program that defines various procedures, and required data, and performs information processing for executing various processes using such programs. The control unit 102 is functionally conceptually provided with an image input unit 102a, an edge detecting unit 102b, a tilt detecting unit 102c, a document end detecting unit 102d, a straight line creating unit 102e, a tilt correcting/clipping unit 102f, and an image output unit 102g.

The image input unit 102a, which obtains the image, inputs (captures) the image including the document area corresponding to the document read by the image reader 100.

The edge detecting unit 102b, which detects an edge coordinate, detects the coordinate values of edge candidate pixels, which are candidates of the pixels composing the edge of the document area, based on the image input (captured) by the image input unit 102a. The edge detecting unit 102b may detect the coordinate values of the edge candidate pixels while removing the noise included in the image.

The tilt detecting unit 102c, which calculates the tilt or obtains the tilt, calculates the tilt of the document area based on the coordinate values of the edge candidate pixels detected by the edge detecting unit 102b, or obtains the tilt of the document area detected by a predetermined sensor (not shown) provided in the image reader 100 to detect the tilt of the document area. The tilt detecting unit 102c may calculate an edge candidate straight line, which is the candidate of the straight line corresponding to the edge, by the predetermined method such as the Hough transformation and the least-square method, based on the coordinate values of the edge candidate pixels, and calculate the tilt of the document area based on the calculated edge candidate straight line. The tilt detecting unit 102*c* may calculate edge continuity information regarding continuity of the edge based on the coordinate values of the edge candidate pixels, and calculate the tilt of the document area based on the calculated edge continuity information. The tilt detecting unit 102*c* may calculate statistic regarding the tilt of adjacent edges based on the coordinate values of the edge candidate pixels, and calculate the tilt of the document area based on the calculated statistic.

The document end detecting unit 102*d*, which extracts an edge end coordinate, detects the coordinate value of an edge end candidate pixel, which is the candidate of the pixel corresponding to an end of the edge (corner of the document area), based on the coordinate values of the edge candidate pixels. The document end detecting unit 102*d* may detect an outermost one of the coordinate values of the edge candidate pixels as the coordinate value of the edge end candidate pixel, based on the coordinate values of the edge candidate pixels and the tilt of the document area detected by the tilt detecting unit 102*c*. The document end detecting unit 102*d* may calculate the straight line parallel to the tilt and passing through the edge candidate pixels and the straight line horizontal to the tilt and passing through the edge candidate pixels, based on the coordinate values of the edge candidate pixels and the tilt of the document area detected by the tilt detecting unit 102*c*, and detect the coordinate value of the intersection of the calculated straight lines as the coordinate value of the edge end candidate pixel. The document end detecting unit 102*d* may correct the coordinate values of the edge candidate pixels based on the coordinate values of the edge candidate pixels and the tilt of the document area detected by the tilt detecting unit 102*c*, and detect the outermost one of the coordinate values of the edge candidate pixels after being corrected, as the coordinate value of the edge end candidate pixel.

The straight line creating unit 102*e*, which calculates the straight line, creates the straight line corresponding to the edge based on the tilt of the document area detected by the tilt detecting unit 102*c* and the coordinate value of the edge end candidate pixel detected by the document end detecting unit 102*d*.

The tilt correcting/clipping unit 102*f*, which corrects the tilt and/or clips the area, corrects the tilt of the document area by rotating the document area based on the straight line corresponding to the edge created by the straight line creating unit 102*e* and/or clips the document area from the image based on the straight line corresponding to the edge created by the straight line creating unit 102*e*.

The image output unit 102*g* outputs the image including the document area obtained by correcting the tilt by the tilt correcting/clipping unit 102*f* and the document area clipped by the tilt correcting/clipping unit 102*f*.

The edge storage unit 104 stores information regarding the edge such as the coordinate values of the edge candidate pixels detected by the edge detecting unit 102*b* and the coordinate value of the edge end candidate pixel detected by the document end detecting unit 102*d*, and other than that, various databases, tables, and files. The edge storage unit 104 is a storage unit, and may be, for example, a fixed disk device such as random access memory (RAM), read-only memory (ROM), and hard disk (HD) or flexible disk, optical disk, or the like. The edge storage unit 104 stores the computer program that can work in coordination with the OS to issue commands to the CPU and cause the CPU to perform various processes.

One example of a second configuration of the image reader 100 is explained with reference to FIG. 8. FIG. 8 is a block diagram showing one example of the second configuration of the image reader 100. An explanation of the portion the same as that of the first configuration is sometimes omitted.

A straight line calculating unit 102*h* is included in at least one of a tilt calculating unit, an edge end coordinate extracting unit, and a straight line calculating unit of the present invention, and calculates the edge candidate straight line, which is the candidate of the straight line corresponding to the edge, by the predetermined method such as the Hough transformation and the least-square method, based on the coordinate values of the edge candidate pixels.

A straight line determining unit 102*i* is included in at least one of the tilt calculating unit, the edge end coordinate extracting unit, and the straight line calculating unit of the present invention, and determines whether the number of the edge candidate straight lines calculated by the straight line calculating unit 102*h* is larger than the number of edges.

A straight line verifying unit 102*j* is included in at least one of the tilt calculating unit, the edge end coordinate extracting unit, and the straight line calculating unit of the present invention, and when a determination result by the straight line determining unit 102*i* is "larger number", verifies the edge candidate straight lines calculated by the straight line calculating unit 102*h* to select appropriate edge candidate straight lines as many as the number of edges.

A document end determining unit 102*k* is included in at least one of the tilt calculating unit, the edge end coordinate extracting unit, and the straight line calculating unit of the present invention, and recognizes the shape of the provisional document area based on the edge candidate straight lines as many as the number of edges selected by the straight line verifying unit 102*j*. The document end determining unit 102*k* calculates the coordinate value of the pixel corresponding to the end of the recognized provisional document area based on the edge candidate straight lines as many as the number of edges selected by the straight line verifying unit 102*j*. The document end determining unit 102*k* knows a positional relationship between the edge candidate pixels and the end of the provisional document area by comparing the calculated coordinate value of the pixel corresponding to the end of the provisional document area and the coordinate values of the edge candidate pixels detected by the edge detecting unit 102*b* (specifically, whether the edge candidate pixel is outside of the end of the provisional document area).

A straight line correcting unit 102*m* is included in at least one of the tilt calculating unit, the edge end coordinate extracting unit, and the straight line calculating unit of the present invention, and appropriately moves the edge candidate straight lines as many as the number of edges selected by the straight line verifying unit 102*j* in parallel so as to pass through the outermost edge candidate pixel, thereby correcting the edge candidate straight lines as many as the number of edges.

A document determining unit 102*n* determines a state of the document read by the image reader 100.

3. Processing of the Embodiment

Figure 9:
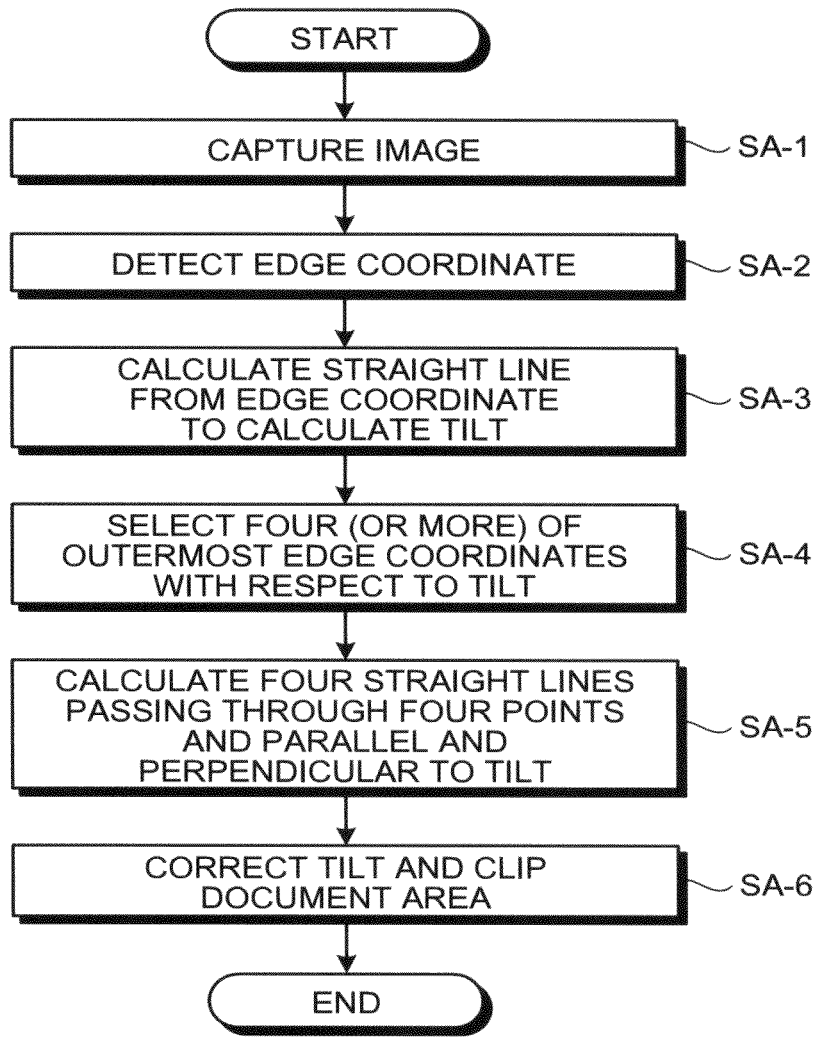
FIG. 9 is a flowchart showing one example of the first main process of the image processor according to the embodiment.
Figure 10:
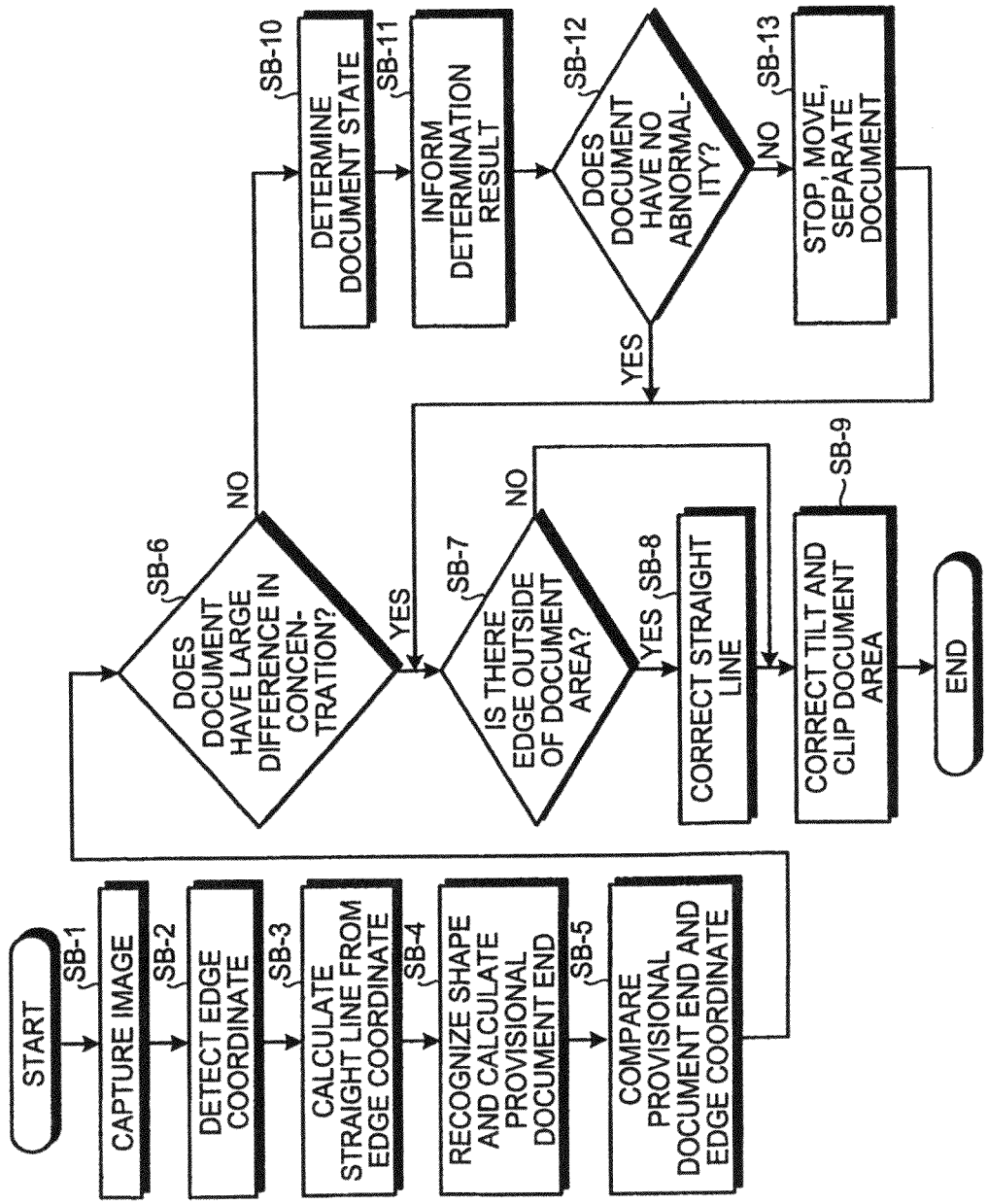
FIG. 10 is a flowchart showing one example of the second main process of the image processor according to the embodiment.

The following describes one example of the main process of an image reader 100 (the first main process and the second main process) according to the present embodiment as configured above with reference to FIGS. 9 and 10. The following describes one example of the first main process performed by the control unit 102 with reference to FIG. 9.

Step SA-1

When the image reader 100 reads, for example, the rectangular document, and generates image data including the document area corresponding to the document, the image input unit 102*a* captures the generated image data.

Step SA-2

The edge detecting unit 102b detects the coordinate values of the edge candidate pixels while sorting them for each edge, based on the image data captured at the step SA-1. The edge detecting unit 102b associates the detected coordinate values of the edge candidate pixels with edge identification information for identifying the edge to which the edge candidate pixels belong (specifically, a name and an ID given to the edge) and stores the same in a predetermined storage area in the edge storage unit 104.

Step SA-3

The tilt detecting unit 102c calculates the edge candidate straight line, which is the candidate of the straight line corresponding to the edge, by the predetermined method such as the Hough transformation and the least-square method, based on the coordinate values of the edge candidate pixels detected at the step SA-2. The tilt detecting unit 102c calculates the tilt (tilt angle) of the document area based on the calculated edge candidate straight line.

Step SA-4

The document end detecting unit 102d selects at least one coordinate value of the outermost point (pixel) with respect to the tilt angle calculated at the step SA-3 from each edge, based on the coordinate values of the edge candidate pixels detected at the step SA-2. Thereby, the document end detecting unit 102d selects the coordinate values of at least a total of four pixels from a total of four edges.

Step SA-5

The straight line creating unit 102e calculates a total of four straight lines, which are the two straight lines parallel to the tilt angle calculated at the step SA-3 and the two straight lines perpendicular to the tilt angle and passing through the four pixels selected at the step SA-4. Thereby, the four straight lines corresponding to the edges of the document area are calculated.

Step SA-6

The tilt correcting/clipping unit 102f corrects the tilt of the document area by rotating the document area based on the four straight lines calculated at the step SA-5 and the tilt angle calculated at the step SA-3. The tilt correcting/clipping unit 102f clips the document area from the image data based on the four straight lines calculated at the step SA-5.

One example of a second main process performed by the control unit 102 is explained with reference to FIG. 10. FIG. 10 is a flowchart for showing one example of the second main process.

Step SB-1

When the image reader 100 reads, for example, the rectangular document and generates the image data including the document area corresponding to the document, the image input unit 102a captures the generated image data.

Step SB-2

The edge detecting unit 102b detects the coordinate values of the edge candidate pixels, while sorting them for each edge, based on the image data captured at the step SB-1. The edge detecting unit 102b associates the detected coordinate values of the edge candidate pixels with the edge identification information for identifying the edge to which the edge candidate pixels belong (specifically, the name and the ID given to the edge) and stores the same in the predetermined storage area of the edge storage unit 104.

Step SB-3

The straight line calculating unit 102h calculates the edge candidate straight line, which is the candidate of the straight line corresponding to the edge, by the predetermined method such as the Hough transformation and the least-square method, based on the coordinate values of the edge candidate pixels detected at the step SB-2. The straight line determining unit 102i determines whether the number of the calculated edge candidate straight lines is equal to or more than five, which is larger than the number of edges, four. When the determination result is "equal to or more than five", the straight line verifying unit 102j verifies the five or more calculated edge candidate straight lines to select appropriate four edge candidate straight lines.

Step SB-4

The document end determining unit 102k recognizes the shape of the provisional document area, based on the four edge candidate straight lines selected at the step SB-3. The document end determining unit 102k calculates the coordinate value of the pixel corresponding to the end of the recognized provisional document area, based on the four edge candidate straight lines selected at the step SB-3.

Step SB-5

The document end determining unit 102k knows the positional relationship between the edge candidate pixels and the end of the provisional document area by comparing the coordinate value of the pixel corresponding to the end of the provisional document area calculated at the step SB-4 and the coordinate values of the edge candidate pixels detected at the step SB-2.

Step SB-6

The control unit 102 determines whether the difference between concentrations of the document area and the lining area is large, based on the image data captured at the step SB-1. When the determination result is "the difference in concentration is large" (step SB-6: No), the process performed by the control unit 102 proceeds to a process at a step SB-7; otherwise (step SB-6: Yes), the process performed by the control unit 102 proceeds to a process at a step SB-10.

Step SB-7 As a result of comparison at the step SB-5, when it is determined that "the edge candidate pixel is outside of the end of the provisional document area" (step SB-7: Yes), the process performed by the control unit 102 proceeds to a process at a step SB-8. As a result of comparison at the step SB-5, when it is not determined that "the edge candidate pixel is outside of the end of the provisional document area" (step SB-7: No), the four edge candidate straight lines selected at the step SB-3 are recognized as the straight lines corresponding to the edges.

Step SB-8

The straight line correcting unit 102m corrects the four edge candidate straight lines by appropriately moving the four edge candidate straight lines selected at the step SB-3 in parallel so as to pass through the outermost edge candidate pixel. The four edge candidate straight lines after being corrected are recognized as the straight lines corresponding to the edges.

Step SB-9

The tilt correcting/clipping unit 102f corrects the tilt of the document area by rotating the document area based on the four edge candidate straight lines recognized as the straight lines corresponding to the edges at the step SB-7 or SB-8. The tilt correcting/clipping unit 102f clips the document area from the image data based on the four edge candidate straight lines recognized as the straight lines corresponding to the edges at the step SB-7 or SB-8.

Step SB-10

The document determining unit 102n determines the state of the document read by the image reader 100.

Step SB-11

The control unit 102 informs the determination result at the step SB-10.

Step SB-12

When the determination result informed at the step SB-11 is "no abnormality in the document state" (step SB-12: Yes), the process performed by the control unit 102 proceeds to the process at the step SB-7, and otherwise (step SB-12: No) proceeds to a process at a step SB-13.

Step SB-13

The control unit 102 stops, moves, and separates the document. The process performed at the control unit 102 proceeds to the process at the step SB-7.

4. Summary of the Embodiment and Other Embodiments

As explained above in detail, the image processor 100 (11) obtains the image including the document area, (12) detects the coordinate values of the edge candidate pixels based on the obtained image, (13) calculates the tilt of the document area based on the detected coordinate values of the edge candidate pixels, (14) extracts the coordinate value of the edge end candidate pixel based on the detected coordinate values of the edge candidate pixels, (15) calculates the straight line corresponding to the edge based on the tilt of the calculated document area and the coordinate value of the extracted edge end candidate pixel, and (16) corrects the tilt of the document area based on the straight line corresponding to the calculated edge and clips the document area from the image based on the straight line.

This enables recognizing the edge of the document area with high accuracy without reducing the process speed and without increasing the memory usage, even when the difference between concentrations of the document area and the lining portion (specifically the difference between concentrations of the edges of the document area and the lining portion) is small, and consequently it is possible to perform the deskewing and the cropping with high accuracy.

The image processor 100 (21) obtains the image including the document area, (22) detects the coordinate values of the edge candidate pixels based on the obtained image, (23) calculates the edge candidate straight line based on the detected coordinate values of the edge candidate pixels, (24) determines whether the number of calculated edge candidate straight lines is larger than the number of edges, (25) when the determination result is "larger", verifies the calculated edge candidate straight lines to select appropriate edge candidate straight lines as many as the edges, (26) recognizes the shape of the provisional document area based on the selected edge candidate straight lines, and calculates the coordinate value of the pixel corresponding to the end of the recognized provisional document area, (27) knows the positional relationship between the edge candidate pixels and the end of the provisional document area by comparing the calculated coordinate value of the pixel corresponding to the provisional document area with the detected coordinate values of the edge candidate pixels, (28) as a result of comparison, when it is determined that "the edge candidate pixel is outside of the end of the provisional document area", corrects the edge candidate straight line by appropriately moving the selected edge candidate straight line in parallel so as to pass through the outermost edge candidate pixel, and recognizes the four edge candidate straight lines after being corrected as the straight lines corresponding to the edges, and (29) corrects the tilt of the document area based on the edge candidate straight lines recognized as the straight lines corresponding to the edges, and clips the document area from the image data based on the straight lines.

This enables recognizing the edge of the document area with high accuracy without reducing the process speed and without increasing the memory usage, even when the difference between concentrations of the document area and the lining portion (specifically, the difference between concentrations of the edges of the document area and the lining portion) is small, and consequently it is possible to perform the deskewing and the cropping with high accuracy. Also, this enables extracting the end of the edge of the document area more correctly and calculating the tilt of the document area more correctly, even when the difference between concentrations of the document area and the lining portion (specifically, the difference between concentrations of the edge of the document area and the lining portion) is small, so that it is possible to recognize the edge of the document area with higher accuracy, and consequently it is possible to perform the deskewing and the cropping with higher accuracy.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth. For example, all the automatic processes explained in the present embodiment can be, entirely or partially, carried out manually. Similarly, all the manual processes explained in the present embodiment can be, entirely or partially, carried out automatically by a known method. The process procedures, the control procedures, specific names, information including registration data for each process and various parameters such as search conditions, display example, and database construction, mentioned in the description and drawings can be changed as required unless otherwise specified.

The distribution and integration of the device are not limited to those illustrated in the figures. The device as a whole or in parts can be functionally or physically distributed or integrated in an arbitrary unit according to various attachments or how the device is to be used.

The constituent elements of the image reader 100 are merely conceptual and may not necessarily physically resemble the structures shown in the drawings. For instance, the apparatus need not necessarily have the structure that is illustrated. For example, the process functions performed by each device of the image reader 100, especially the each process function performed by the control unit 102, can be entirely or partially realized by a CPU and a computer program executed by the CPU or by a hardware using wired logic. The computer program, recorded on a recording medium to be described later, can be mechanically read by the image reader 100 as the situation demands.

The storage devices such as ROM or HD stores the computer program that can work in coordination with the OS to issue commands to the CPU and cause the CPU to perform various processes. The computer program is first loaded to the RAM, and forms a control unit in collaboration with the CPU. Alternatively, the computer program can be stored in any application program server connected to the image reader 100 via the network, and can be fully or partially loaded as the situation demands. The computer-readable recording medium on which the computer program can be stored may be a portable type such as flexible disk, magneto optic (MO) disk, ROM, erasable programmable ROM (EPROM), electrically erasable programmable ROM (EEPROM), compact disk-read-only memory (CD-ROM), digital versatile disk (DVD), or a communication medium that stores the computer program for a short term such as communication channels or carrier waves that transmit the computer program over networks such as local area network (LAN), wide area network (WAN), and the Internet. Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

This invention enables recognizing the edge of the document area with high accuracy without reducing the process speed and without increasing the memory usage, even when the difference between concentrations of the document area and the lining portion (specifically, the difference between concentrations of the edge of the document area and the lining portion) is small, and consequently it is possible to also perform the deskewing and the cropping with high accuracy.

This invention enables recognizing the edge of the document area with higher accuracy, and consequently it becomes possible to perform the deskewing and the cropping with higher accuracy.

This invention enables calculating the tilt of the document area more correctly, and recognizing the edge of the document area with still higher accuracy.

This invention enables extracting the end of the edge of the document area more correctly, and recognizing the edge of the document area with higher accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processor comprising a control unit, wherein the control unit includes
   an image obtaining unit that obtains an image including a document area corresponding to a document read by an image reader;
   an edge coordinate detecting unit that detects coordinate values of edge candidate pixels, which are candidates of pixels composing an edge of the document area based on the image obtained by the image obtaining unit;
   a tilt calculating unit, or a tilt obtaining unit that obtains the tilt of the document area detected by a predetermined sensor;
   an edge end coordinate extracting unit;
   a straight line calculating unit that calculates a straight line corresponding to the edge based on the tilt of the document area calculated by the tilt calculating unit or obtained by the tilt obtaining unit and a coordinate value of an edge end candidate pixel extracted by the edge end coordinate extracting unit;
   at least one tilt correcting unit that corrects the tilt of the document area by rotating the document area based on the straight line corresponding to the edge calculated by the straight line calculating unit, and
   an area clipping unit that clips the document area from the image based on the straight line corresponding to the edge calculated by the straight line calculating unit;
   wherein the tilt calculating unit calculates an edge candidate straight line, which is a candidate of the straight line corresponding to the edge, based on the coordinate values of the edge candidate pixels, and calculates the tilt of the document area based on the edge candidate straight line calculated, and
   the edge end coordinate extracting unit corrects the coordinate values of the edge candidate pixels by correcting the edge candidate straight line by appropriately moving the edge candidate straight line in parallel so as to pass through the outermost edge candidate pixel,
   based on the coordinate values of the edge candidate pixels and the tilt of the document area calculated by the tilt calculating unit or obtained by the tilt obtaining unit, and extracts an outermost one of the coordinate values of the edge candidate pixels after being corrected as the coordinate value of the edge end candidate pixel.

2. The image processor according to claim 1, wherein the edge coordinate detecting unit detects the coordinate values of the edge candidate pixels, while removing noise included in the image.

3. The image processor according to claim 1, wherein the tilt calculating unit calculates an edge candidate straight line, which is a candidate of the straight line corresponding to the edge, by a predetermined method such as a Hough transformation and a least-square method, based on the coordinate values of the edge candidate pixels, and calculates the tilt of the document area based on the edge candidate straight line calculated.

4. The image processor according to claim 1, wherein the tilt calculating unit calculates edge continuity information regarding continuity of the edge based on the coordinate values of the edge candidate pixels, and calculates the tilt of the document are based on the edge continuity information calculated.

5. The image processor according to claim 1, wherein the tilt calculating unit calculates statistics regarding the tilt of adjacent edges, based on the coordinate values of the edge candidate pixels, and calculates the tilt of the document area based on the statistics calculated.

6. The image processor according to claim 1, wherein the edge end coordinate extracting unit extracts an outermost one of the coordinate values of the edge candidate pixels as the coordinate value of the edge end candidate pixel, based on the coordinate values of the edge candidate pixels and the tilt of the document calculated by the tilt calculating unit or obtained by the tilt obtaining unit.

7. The image processor according to claim 1, wherein the edge end coordinate extracting unit
   calculates the straight line parallel to the tilt and passing through the edge candidate pixels and the straight line horizontal to the tilt and passing through the edge candidate pixels, based on the coordinated values of the edge candidate pixels and the tilt of the document area calculated by the tilt calculating unit or obtained by the tilt obtaining unit, and
   extracts the coordinate value of an intersection of the straight lines calculated as the coordinate value of the edge end candidate pixel.

8. An image processing method executed by an image processor comprising a control unit, wherein the method comprises
   an image obtaining step of obtaining an image including a document area corresponding to a document read by an image reader;
   an edge coordinate detecting step of detecting coordinate values of edge candidate pixels, which are candidates of pixels composing an edge of the document area based on the image obtained at the image obtaining step;
   a tilt calculating step of calculating an edge candidate straight line, which is a candidate of the straight line corresponding to the edge, based on the coordinate values of the edge candidate pixels, and calculates the tilt of the document area based on the edge candidate straight line calculated, or a tilt obtaining step that obtains the tilt of the document area detected by a predetermined sensor;

an edge end coordinate extracting step of correcting the coordinate values of the edge candidate pixels by correcting the edge candidate straight line by appropriately moving the edge candidate straight line in parallel so as to pass through the outermost edge candidate pixel based on the coordinate values of the edge candidate pixels and the tilt of the document area calculated at the tilt calculating step or obtained at the tilt obtaining step, and extracting an outermost one of the coordinate values of the edge candidate pixels after being corrected as a coordinate value of an edge end candidate pixel;

a straight line calculating step of calculating a straight line corresponding to the edge based on the tilt of the document area calculated at the tilt calculating step or obtained at the tilt obtaining step and the coordinate value of the edge end candidate pixel extracted at the edge end coordinate extracting step;

at least one tilt correcting step of correcting the tilt of the document area by rotating the document area based on the straight line corresponding to the edge calculated at the straight line calculating step; and an area clipping step of clipping the document area from the image based on the straight line corresponding to the edge calculated at the straight line calculating step.

9. A computer program product having a non-transitory computer readable medium including programmed instructions which, when executed by a computer, cause the computer to perform an image processing method comprising:

an image obtaining step of obtaining an image including a document area corresponding to a document read by an image reader;

an edge coordinate detecting step of detecting coordinate values of edge candidate pixels, which are candidates of pixels composing an edge of the document area based on the image obtained at the image obtaining step;

a tilt calculating step of calculating an edge candidate straight line, which is a candidate of the straight line corresponding to the edge, based on the coordinate values of the edge candidate pixels, and calculates the tilt of the document area based on the edge candidate straight line calculated, or a tilt obtaining step of obtaining the tilt of the document area detected by a predetermined sensor;

an edge end coordinate extracting step of correcting the coordinate values of the edge candidate pixels by correcting the edge candidate straight line by appropriately moving the edge candidate straight line in parallel so as to pass through the outermost edge candidate pixel, based on the coordinate values of the edge candidate pixels and the tilt of the document area calculated at the tilt calculating step or obtained at the tilt obtaining step, and extracting an outermost one of the coordinate values of the edge candidate pixels after being corrected as a coordinate value of an edge end candidate pixel;

a straight line calculating step of calculating a straight line corresponding to the edge based on the tilt of the document area calculated at the tilt calculating step or obtained at the tilt obtaining step and the coordinate value of the edge end candidate pixel extracted at the edge end coordinate extracting step;

at least one tilt correcting step of correcting the tilt of the document area by rotating the document area based on the straight line corresponding to the edge calculated at the straight line calculating step; and an area clipping step of clipping the document area from the image based on the straight line corresponding to the edge calculated by the straight line calculating step.

* * * * *